Figure 1:
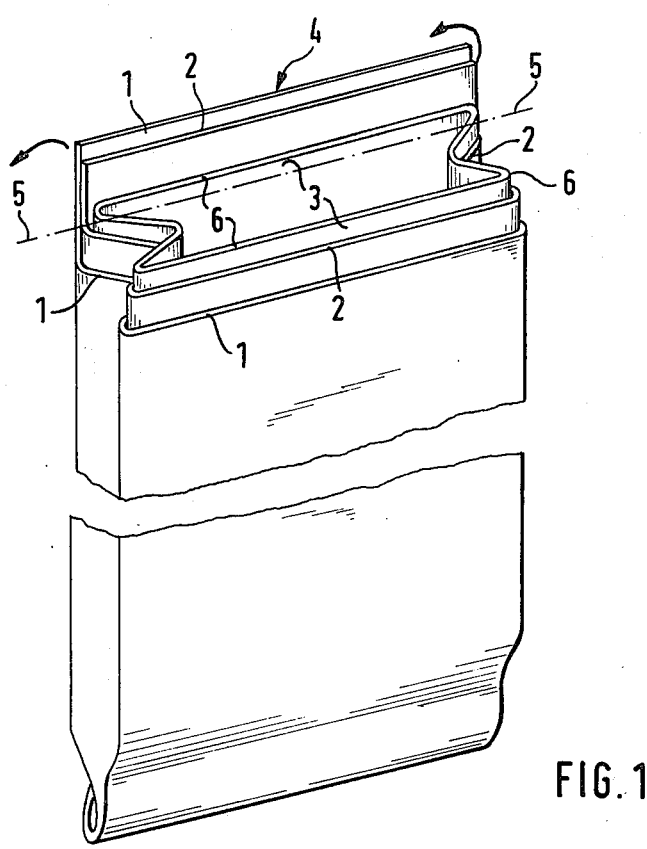

United States Patent [19]

Kuckhermann

[11] 4,353,770
[45] Oct. 12, 1982

[54] METHOD FOR WELDING THE INNER LAYERS OF MULTI-LAYER PAPER SACKS

[75] Inventor: Gustav Kuckhermann, Achern, Fed. Rep. of Germany

[73] Assignee: Icoma Packtechnik GmbH, Achern, Fed. Rep. of Germany

[21] Appl. No.: 218,238

[22] Filed: Dec. 19, 1980

[30] Foreign Application Priority Data

Dec. 21, 1979 [DE] Fed. Rep. of Germany ....... 2951597
Dec. 6, 1980 [DE] Fed. Rep. of Germany ....... 3046036

[51] Int. Cl.³ ............................ C09J 5/02; B31B 1/14; B65D 33/02
[52] U.S. Cl. ................................. 156/308.4; 493/267; 493/245; 493/227; 229/55; 156/227
[58] Field of Search ............... 156/309.3, 308.4, 307.7, 156/273, 226, 224, 303.1, 304.2, 304.6, 212, 182, 324.4, 499, 227; 493/DIG. 933, 206, 207, 209, 201, 200, 199, 189, 205, 212, 217, 245, 267, 266; 229/55

[56] References Cited

U.S. PATENT DOCUMENTS 2,709,549  5/1955  Haslacher ......................... 493/217
3,133,480  5/1964  Gerard .............................. 493/209
4,088,264  5/1978  Vogt .................................. 493/324

Primary Examiner—Edward C. Kimlin
Assistant Examiner—L. Falasco
Attorney, Agent, or Firm—Pollock, Vande Sande and Priddy

[57] ABSTRACT

For a method of welding multi-layer paper sacks with weldable inner surfaces, the outer layers are folded back from the weldable inner layer during welding. The welding energy reaches the inner layer directly. The welding process is substantially shortened in comparison with known methods, and both the production time and processing time with such paper sacks is reduced.

5 Claims, 10 Drawing Figures

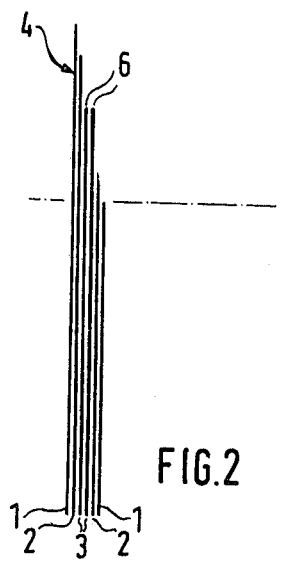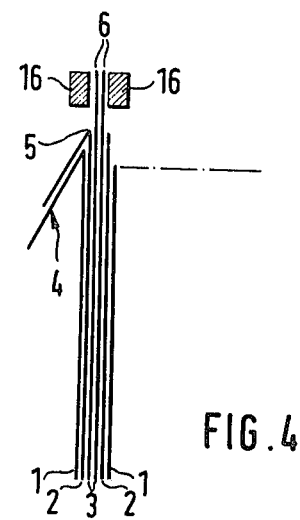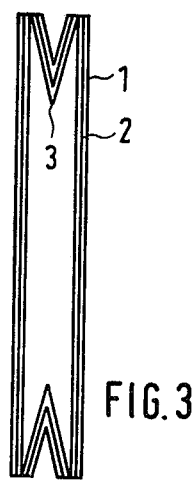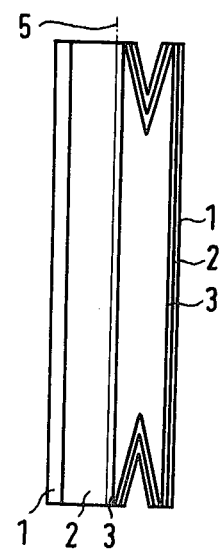

METHOD FOR WELDING THE INNER LAYERS OF MULTI-LAYER PAPER SACKS

The invention concerns a method for welding the inner layers of a multi-layer paper sack with a weldable coating on the inner layer and a stepped closure flap.

Various embodiments of multi-layer paper sacks with weldable inner layers are known. For example, a strip of foil can be coated on or glued to the innermost paper layer. Also, the inside of the inner layer can be provided with a thermoplastic coating, for example a coating of polyethelene.

Welding of the weldable inner layer was effected until now by various methods of heat application. It is known, for example, to apply the required heat to the weld positions by means of heated bars. Welding with the aid of infra-red radiation is also known.

With all previously known methods it has proved disadvantageous that only on one side, for example the front of the paper sack can the inner layer being welded be directly subjected to heat. The rearmost inner layer which is being welded to the foremost inner layer can not be directly reached from the rear of the sack. Instead, the heat for the rearmost inner layer must be applied through the closure flap overlapping the rearmost inner layer. The result of this is that the manufacturing and operating speed of such sacks with weldable inner layers is limited. The operating speed is determined substantially by the thickness and the number of outer paper layers surrounding the inner layer or inner coating.

The purpose of the invention is to improve the initially mentioned method so as to permit an operating speed, as high as possible, and independent of the thickness and number of outer layers.

This purpose is achieved according to the invention in that prior to welding, the closure flap arranged on the rear of the sack is folded back from the inner layer along a line which, as viewed towards the center of the sack, lies behind the edge of the inner layer, and that with the closure flap in the folded back position heat is applied to the exposed inner layer for welding the mated inner coatings.

Such a method permits an extremely high operating speed of the paper sacks. As a result of the required heat being applied directly to the inner layers being welded and not having to pass through inhibiting outer layers, the required welding joint is not only quickly achieved but also of improved quality.

It has proved to be of advantage that the necessary heat energy for welding the inner layers is applied at least substantially from the front onto the edges of the inner layers.

The application of heat energy from the front onto the edges can be achieved very easily with the aid of an infra-red heating element arranged along the edges. It is thereby practical that the energy emission can be controlled in dependence on the advance speed of the paper sacks as a plurality of such sacks are transported in succession past the infra-red heating element.

According to a further characteristic of the invention the fold is situated at least substantially flush with the edges of the inner layers. With such an embodiment the provision of slits in the side pleats down as far as the fold for the flap can be avoided.

Finally, it is suggested according to the invention that the inner layers are pressed together in the region of the edges by means of clamping elements, while the heat energy required for welding is provided by an infra-red lamp.

Such an embodiment has the advantage that the application of heat is limited to those regions in which the heat is actually needed, namely in the region of the edges. The foil shrinks together due to the effect of the heat, but at most only as far as the clamping elements. A particularly good formation of the weld is thus ensured. In practice the clamping elements or the thereby created pressure lines are situated 5 to 10 mm below the edges of the inner layers. The welding and shrinking process occurs on the protruding region of 5 to 10 mm. The welding joint thus formed can be stressed to a greater extent than the usual welding joints created with the aid of heated clamping elements, welding strips or the like.

Figure 6:
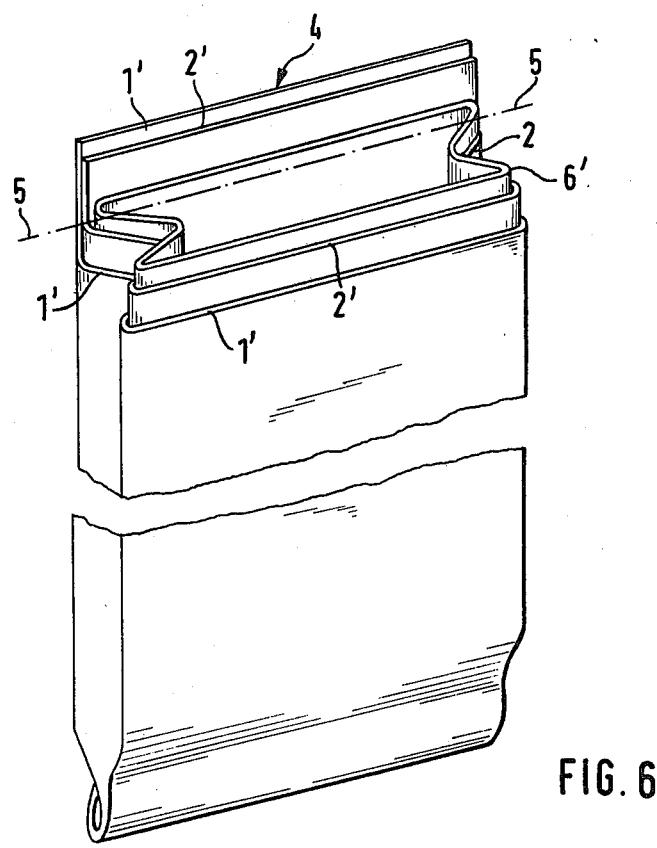
Figure 7:
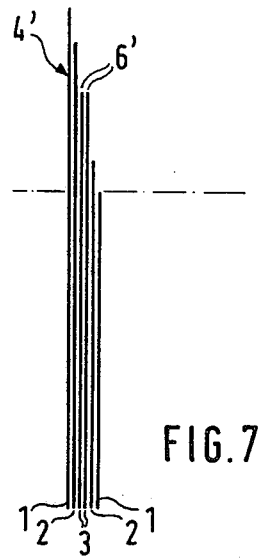
Figure 9:
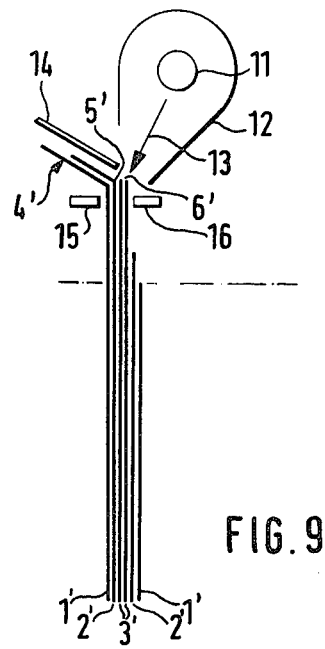
Figure 8:
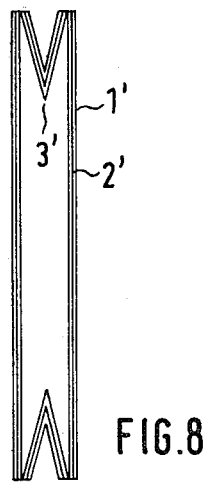
Figure 10:
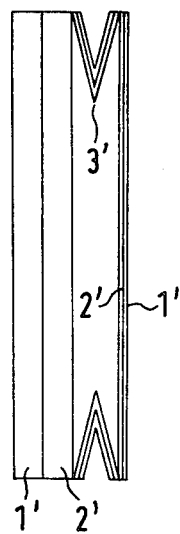

In the following, the invention will be described in detail with the aid of the drawings, wherein FIG. 1 is a perspective view of a pleated sack having a closure flap, which can be processed by the method according to the invention, FIG. 2 is a schematic side view of a triple-layer pleated sack, FIG. 3 is a plan view from above of the pleated sack according to FIG. 2, FIG. 4 is a schematic view according to FIG. 2 with the closure flap folded back, FIG. 5 is a schematic view according to FIG. 3 with the closure flap folded back, FIG. 6 is a perspective view of a pleated sack as shown in FIG. 1, FIG. 7 is a schematic side view of a triple-layer pleated sack analogous to FIG. 2, FIG. 8 is a plan view from above of the pleated sack according to FIG. 7, FIG. 9 is a schematic view of the pleated sack according to FIG. 7 with welding means, and FIG. 10 is a plan view of the pleated sack with the closure flap folded back according to FIG. 9.

In the drawings like parts have been provided with the same reference numerals. With the embodiment according to FIGS. 6 to 10, these reference numerals have been augmented with an apostrophe.

Referring first to the embodiment according to FIGS. 1 to 5:

The pleated sack consists of a total of three layers, namely two outer paper layers 1 and 2 and an inner layer 3 which is also paper but provided on the inside with a polyethelene coating. For employing the method according to the invention sacks with any desired number of outer layers of paper are suitable. The greater the number of outer paper layers, the more advantageous is the employment of the method according to the invention.

The inner layer 3 can also, for example, be coated with a polyethelene film and/or aluminum foil. It is also possible for the inner layer 3 to consist entirely of polyethelene.

The closure flap 4 is folded back along the fold line 5. By folding back the closure flap 4, the inner layer 3 is made accessible from both sides (see FIG. 4) and can then be welded, for example with the aid of heated bars 16. The fold 5 is situated-as viewed towards the center of the sack-below the edges 6 of the inner layer 3 which is to be welded.

Now referring to the embodiment according to FIGS. 6 to 10: This embodiment is similar to the embodiment of FIGS. 1–5, except in respect to the type of heating apparatus which is employed and the extent to which the closure flap is folded back (compare FIGS. 4 and 9).

With this second embodiment the pleated sack again consists of a total three layers, namely of two outer layers of paper 1' and 2' and an inner layer 3'. The inner layer 3' consists wholly or partly of polyethelene.

The closure flap 4' is folded back along the fold line 5'. By folding back the closure flap 4' along the fold line 5' the edges 6' of the inner layer 3' are made more accessible for the heat application.

As shown in FIG. 9, the welding apparatus used in this second embodiment of the invention comprises an infra-red lamp consisting substantially of a heating rod 11 and a reflector 12 which provides energy in the direction of the arrow 13 onto the edges 6' of the inner layer 3'. The flap 4' with the two outer layers of paper is folded back to a lesser extent than in FIG. 4. The energy emission of the infra-red lamp is preferably controlled in dependence on the speed of advance of the paper sacks past said lamp. A protecting shield 14 is positioned in overlying relation to the folded back flap 4' and ensures that the welding energy is directed accurately to the edges 6' of the inner layer 3'. Two clamping elements 15 and 16 are pressed together and prevent the welding energy from spreading over a larger area than projects beyond the clamping elements 15 and 16 towards the infra-red lamp. When heat is applied the welding process ends at the clamping elements 15 and 16.

The clamping elements 15 and 16 are situated about 5 to 10 mm below the edges 6' of the inner layer 3'. The inner layer 3' can also consist of a plastic coated paper layer.

The clamping elements 15 and 16 can be made up of several parts as required, and can effect clamping with the aid of pressure springs.

I claim:

1. A method for welding together the free edges of the inner layer of a multi-layer paper sack, wherein the sack is of the type consisting of front and back paper sheets the edges of which define two opposing outer faces, an open mouth extending transversely between the longitudinal side edges of said outer faces, and a closed bottom extending between the side edges of said outer faces in spaced relation to said open mouth, said sack further including a pair of inner sheets that are disposed in facing relation to one another between said front and back paper sheets, said inner sheets having transverse edges which are disposed adjacent the open mouth of the sack and comprising a heat weldable material adjacent at least said transverse edges, the outer face of said sack defined by said back paper sheet extending in a longitudinal direction relative to the bottom of the sack beyond said open mouth and beyond said transverse edges of said inner sheets to define a closure flap which normally overlies said transverse edges of said inner sheets, said method including the step of folding the closure flap portion of said back paper sheet away from said inner sheets along a fold line which extends in a transverse direction between the longitudinal side edges of the sack and which transverse fold line is located between the bottom of the sack and the said transverse edges of said inner sheets thereby to fully expose said transverse edges of said inner sheets, and, with the said closure flap in its said folded back position, thereafter applying heat directly to said exposed transverse edges of said pair of inner sheets thereby to weld together the inner surfaces of said inner sheets along a region which extends in a transverse direction across the inner layer of said sack.

2. The method of claim 1 wherein said heat is applied from a position adjacent the front face of the sack.

3. The method of claim 1 wherein said fold line is situated almost flush with said transverse edges of said inner sheets.

4. The method of claim 1 including the step of pressing said inner sheets together adjacent their said transverse edges during the application of said heat.

5. The method of claim 1 wherein said heat is applied by an infrared lamp, a plurality of said sacks being transported in succession past said lamp, and controlling the energy emission of said lamp in dependence upon the speed of transport of said sacks past said lamp.

* * * * *